Patented Jan. 29, 1935

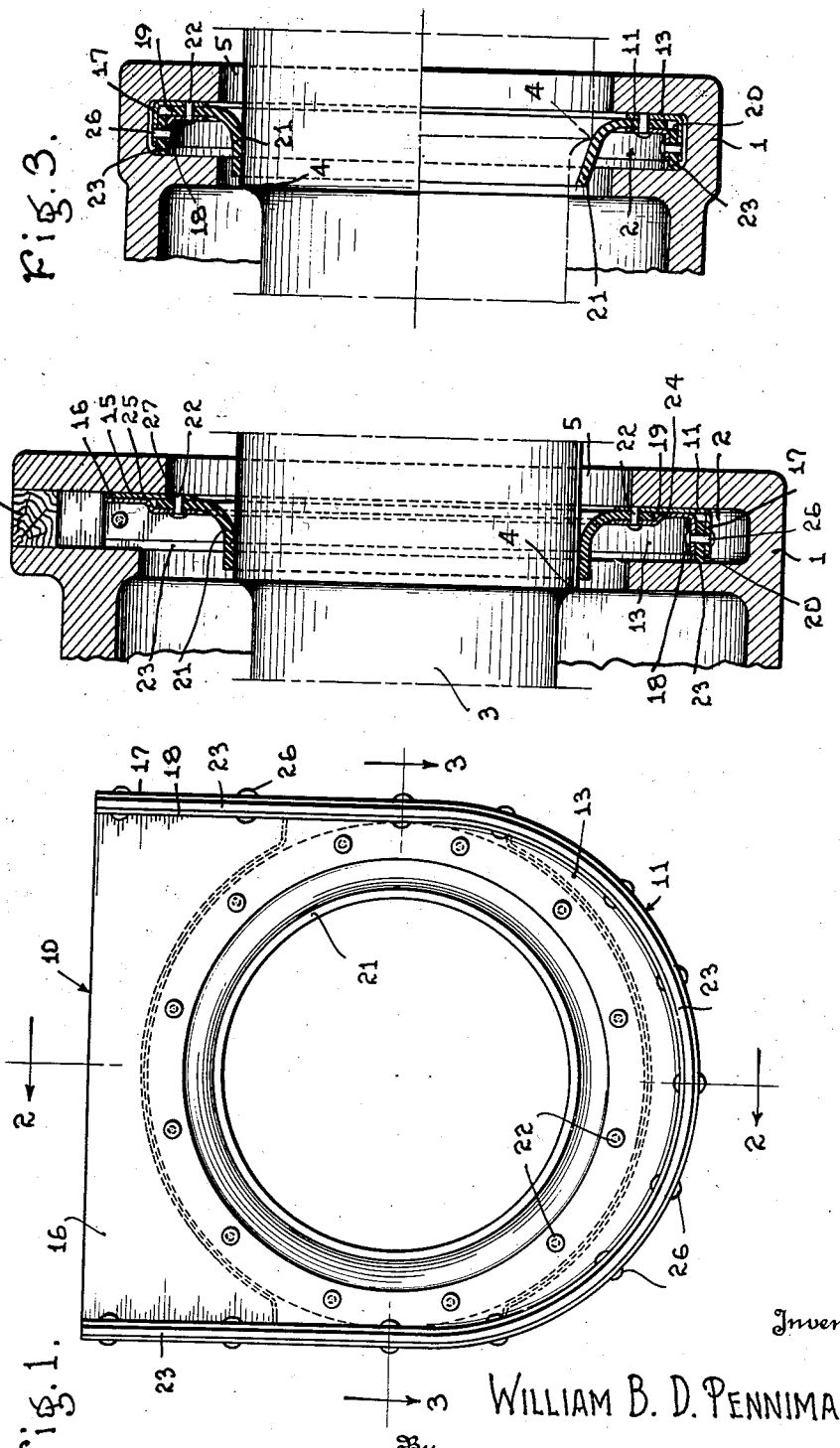

1,989,110

UNITED STATES PATENT OFFICE 1,989,110

OIL SEAL AND DUST GUARD

William B. D. Penniman, Baltimore, Md.

Application March 5, 1929, Serial No. 344,429

2 Claims. (Cl. 286—6)

This invention relates to oil seals and particularly to oil seals and dust guards for use with axles and journal boxes on street and other railway cars.

A large number of suggestions have been made in the prior art with respect to oil seals for use on railway car axles, but these have proved unsatisfactory for a number of reasons among which there may be mentioned, first, many of such devices were not in fact sealing in their action, or after relatively a short period lost their sealing effect; second, many such devices were of so complicated a nature that they were ineffective; and third, a number of such devices required elaborate changes in the structure of the journal boxes actually in use. Any or all of these reasons prevented such prior art suggestions from solving the problems presented in producing an effective oil seal and dust guard in this art.

In my prior application Serial No. 209,256 filed July 29, 1927, there is disclosed an effective and satisfactory form of oil seal and dust guard in which a flexible leather diaphragm embraces the axle within the journal box, and in which the flexibility of the leather diaphragm acts to take up the stresses and strains produced by relative movement between the axle and journal box, an effective seal being thus produced that has maintained its action over relatively long periods of time.

The present invention is concerned with an improvement over the form of the device set forth in that prior application. Among the objects of the present invention is the production of an effective but simple oil seal for journal boxes and related devices, that may be applied to existing equipment on railways etc. and will require no change in the present construction of journal boxes now in use.

Other and further objects and advantages will appear from the more detailed description set forth below it being understood however that this more detailed description is given by way of illustration only, and not by way of limitation, since various changes in that description may be made by those skilled in the art without departing from the scope and spirit of the invention hereindescribed.

In connection with that more detailed description there is shown in the accompanying drawing, in Figure 1, a front elevation of the improved oil seal; in Figure 2, a section on line 2—2 of Figure 1, and also showing the oil seal in position in a journal box; in Figure 3, a section on line 3—3 of Figure 1, the upper portion of Figure 3 illustrating the axle in position within the oil seal, while the lower portion of Figure 3 shows the oil seal diaphragm at the instant that the axle is to be inserted and the oil seal is to be stretched thereabout.

As illustrated in the drawing, there is shown an oil seal consisting of a diaphragm of flexible material adapted to embrace the axle and prevent passage of oil or water, etc., between such diaphragm and the axle. The diaphragm is maintained in position within the journal box by frictional engagement with the walls thereof, such engagement being desirably effected for example by means of a compressible strip which may serve to wedge the oil seal proper within the dust guard slot or groove of the journal box. By placing the compressible strip under rigorous compression against the walls of the dust guard slot, a tight seal is obtained.

Referring more particularly to the illustrated form of the device, there is shown at 1 the journal box provided with the dust guard slot 2 generally open at the top, which opening may be tentatively closed by a wood block as 6. The axle 3, having a dust guard seat 4, enters the journal box 1 through the opening 5. This opening is sufficiently large so that the relative movements between axle and journal box may readily take place. The journal box and related axle are represented as normal structures now in actual use, and other conventional elements such as the usual bearing brass and wedge, etc., are not illustrated. The mounting of the box on the frame or other portion of the car truck is also not illustrated, since this is conventional structure and is unnecessary to an understanding of the present invention.

Turning more particularly to the oil seal illustrated in the drawing, this oil seal generally referred to as 10 in that drawing may be constructed with more or less annularly shaped plates 11 and 13 having openings 12 and 14 substantially alined through which openings the axle may pass. These plates 11 and 13 desirably terminate in substantially straight upper ends as shown at 15 and 16 respectively, which upper ends desirably follow the contour of the inner walls of the slot 2 of the box 1. The outer edges of the plates 11 and 13 are desirably flanged as shown at 17 and 18 and the plates being maintained in a spaced relation provide a channel or groove for purposes described below. The flanges 17 and 18 referred to preferably extend around the edges of the plates 11 and 13 except that it is unnecessary to carry such flanges across the upper edges of the plates. The plates 11 and 13 in their spaced relation form a channel or groove between them as indicated at 19 and 20 respectively. This channel or groove serves to receive the diaphragm 21 which may be substantially annular in contour the diaphragm being held in position between the plates 11 and 13 by means of rivets or bolts 22. The diaphragm is of sufficient length to extend within the openings 12 and 14 so that when the axle is inserted through such openings, the axle is closely embraced by the inner end of the diaphragm. Further features of the diaphragm particularly the material from which it is made, are set forth below.

The contiguous flanged portions of the plates 11 and 13 also serve as a channel or groove as set forth above to receive a compressible engagement strip or element 23 which desirably extends over the entire flanged portion of the plates 11 and 13. This strip 23 is also adapted to be compressed against the walls of the slot 2 under considerable pressure so that a tight seal is obtained, and further a frictional engagement of such character is secured that movements of the axle with respect to the box cause stresses in the diaphragm 21 which are taken up or absorbed by that diaphragm, rather than by bodily movement of the oil seal within the slot 2. The compressible engagement strip 23 thus firmly wedges the oil seal within the slot 2 and substantially prevents the movement of the oil seal 10 with respect to the walls of the journal box.

The diaphragm 21 and the strip 23 may be made of one continuous piece of leather or other material of appropriate character, in which case such material will extend from between the plates at the inner edges to produce the axle embracing portion, and at the outer edges of the plates to form the wall's engaging member. It is considered more desirable however to form the diaphragm of a separate piece of material from that of the compressible engagement strip, this form of the device being the preferred one and is illustrated in the drawing. In this event, the plates 11 and 13 may desirably be pressed toward each other as indicated at 24 and 25 respectively, so that such compressed portions of the plates serve as seats for the inner edges of the diaphragm and of the compressible engagement strip.

As illustrated, the width of the flanges 17 and 18 should preferably be such that they are slightly narrower than the slot 2 so that the compressible and frictional engagement strip 23 extending beyond the edges of these flanges will engage the wall of the box. The engagement strip 23 may, also be held in position within the groove or channel of the plates by means of rivets or bolts 26. The engagement strip is desirably made of the same material as that out of which the diaphragm is produced, but any other suitable material capable of producing the tight seal under severe compression may be used.

As indicated above, the diaphragm is so made that it serves to take up within itself the relative movement between the axle and journal box. For this use, the material out of which the diaphragm is made should be flexible, elastic, resilient, pliable, supple, or properly yieldable. A flexible or elastic diaphragm made from leather is an excellent means for these purposes and is used illustratively below. To prepare a diaphragm the following procedure may be used.

A piece of leather of suitable size and shape is soaked in water until it can be stretched in any direction. It is then subjected to hydraulic or other pressure to form it into the desired shape, which is more or less ramekin or cup-like. It is then dried while retained in the mold so that the impressed shape is maintained. Subsequently it is soaked in sperm or other oil. This procedure results in a highly desirable article due to its flexibility and toughness, but of course other methods of forming and preparing the material may be utilized.

The central portion of the leather article may then be cut therefrom leaving substantially annular leather diaphragm, in which the opening is smaller than the axle about which it is to be placed, so that the seal will closely embrace that axle. For such purposes the opening may be for example one-fourth inch less than the diameter of the axle.

The oil seal is readily assembled by associating the plates with the diaphragm and the compressible engagement strip between the plates, and the parts rigidly secured together as by rivets or bolts as illustrated.

In placing the oil seal in position, the oil seal may be driven into the slot 2 of the journal box before the axle, etc., have been associated with the journal box. Due to the arrangement of parts disclosed above, the compressible engagement strip is thus placed under rigorous pressure to secure the desired result by its compression against the walls of the dust guard slot. If desired, the oil seal may be retained in its position by a locking device as by means of lugs 27 carried by the plate 11, which lugs or locking device also serve to prevent relative movement between the oil seal structure and the journal box. These lugs as shown contact with the opening 5 of the walls of the journal box for the purposes described above.

In this position and prior to the placing of the axle in position, the diaphragm takes the position indicated in the lower half of Figure 3 of the drawing, the sleeve portion of the diaphragm at its inner end extending up into the space that will later be occupied by the axle.

As the axle is inserted through the opening 5, the dust guard seat 4 of the axle distends the diaphragm and since the opening in the diaphragm is smaller than the diameter of the axle 3, the insertion of the axle through the opening in the diaphragm forces the latter to embrace the axle snugly and thus provides a substantially tight joint that is oil, water, and dust tight.

The compressible engagement strip which is thus wedged between the oil seal plates 11 and 13, and the severe compression of this strip against the walls of the slot 2 also serves to complete the tight joint.

Due to the flexibility of the leather, and also its toughness, the seal is very satisfactory and exhibits a relatively long life. The character of the diaphragm is such that it takes up the relative movements of the axle with respect to the journal box because of the fact that the seal does not move substantially with respect to the box.

If desired a coil spring may be placed about the sleeve of the diaphragm to insure its snug fit against the axle, but such spring is not essential.

The slot 2 may be closed by a block 6 or in any other manner.

The present invention therefore supplies an oil seal that may be applied to existing equipment on railways cars and the like without requiring any modification of the existing structure of such cars. And although the oil seal may be readily placed in position or removed, an effective seal is produced.

Having thus set forth my invention, I claim:

1. In combination, a journal box having a slot therein, and an oil seal and dust guard positioned within said slot, said seal comprising a metallic plate rigidly carrying a flexible annular diaphragm having a free axial flange adapted to embrace an axle closely, one face of the metallic plate engaging directly against a wall of the slot in said journal box, and a compressible non-metallic member carried by said plate and engaging frictionally against another wall of the slot of the journal box, whereby movement of the seal with respect to the box is substantially prevented under operating conditions, and movements of the axle with respect to the journal box are substantially absorbed by the flexible annular diaphragm.

2. In combination, a journal box having a slot therein, and an oil seal and dust guard positioned within said slot, said seal comprising two metallic plates maintained in spaced relation and having axle openings therein, said plates rigidly carrying a flexible annular diaphragm held rigidly between said plates within the axle openings, said diaphragm having a free axial flange adapted to embrace an axle closely, one face of one of the metallic plates engaging directly against a wall of the slot in said journal box, and a compressible non-metallic member carried by said plates and engaging frictionally against another wall of the slot of the journal box, whereby movement of the seal with respect to the box is substantially prevented under operating conditions, and movements of the axle with respect to the journal box are substantially absorbed by the flexible annular diaphragm.

WILLIAM B. D. PENNIMAN.